(12) United States Patent
Lee

(10) Patent No.: US 11,841,110 B1
(45) Date of Patent: Dec. 12, 2023

(54) ACCESSORY DEVICE FOR PORTABLE TERMINAL

(71) Applicant: Jong Su Lee, Seoul (KR)

(72) Inventor: Jong Su Lee, Seoul (KR)

(*) Notice: Subject to any disclaimer, the term of this patent is extended or adjusted under 35 U.S.C. 154(b) by 0 days.

(21) Appl. No.: 18/296,142

(22) Filed: Apr. 5, 2023

(30) Foreign Application Priority Data

Nov. 10, 2022  (KR) .......................... 10-2022-0149669
Dec. 29, 2022  (KR) .......................... 10-2022-0188842

(51) Int. Cl.
*F16M 13/00* (2006.01)

(52) U.S. Cl.
CPC .................................. *F16M 13/005* (2013.01)

(58) Field of Classification Search
CPC ...... F16M 13/005; F16M 11/38; F16M 13/04; F16M 11/40; F16M 11/10; H04M 1/04; A45F 2200/0516
USPC .......................................................... 248/688
See application file for complete search history.

(56) References Cited

U.S. PATENT DOCUMENTS

| | | | | |
|---|---|---|---|---|
| 4,565,343 A * | 1/1986 | Lake, Jr. | ................ | F16M 11/38 |
| | | | | 248/346.06 |
| 9,787,348 B2 * | 10/2017 | Srour | .................... | H04R 1/1033 |
| 9,958,107 B1 * | 5/2018 | Hobbs | .................... | F16M 13/00 |
| 10,200,518 B2 * | 2/2019 | Richter | ...................... | A45F 5/00 |
| 10,348,352 B2 * | 7/2019 | Barnett | .................. | F16M 13/00 |
| 10,469,640 B2 * | 11/2019 | Gartz | .................... | F16M 11/14 |
| 10,638,627 B1 * | 4/2020 | Stime | ...................... | F16M 11/10 |
| 10,724,280 B1 * | 7/2020 | Srour | .................... | F16M 11/121 |
| 10,750,844 B2 * | 8/2020 | Peterson | .................... | A45F 5/00 |
| 10,774,871 B1 * | 9/2020 | Srour | ...................... | F16C 11/12 |
| 10,897,984 B2 * | 1/2021 | Roth | ........................ | A45F 5/00 |
| 11,149,902 B2 * | 10/2021 | Barnett | ................ | F16M 13/005 |
| 11,689,237 B2 * | 6/2023 | Kim | ........................ | H04M 1/04 |
| | | | | 455/575.1 |
| 2017/0195000 A1 * | 7/2017 | Srour | .................... | H04R 1/1033 |
| 2018/0051851 A1 * | 2/2018 | Hobbs | .................. | F16M 13/022 |
| 2018/0262603 A1 * | 9/2018 | Richter | .................... | H04M 1/04 |
| 2019/0140682 A1 * | 5/2019 | Barnett | ................ | A44B 99/005 |
| 2020/0217449 A1 * | 7/2020 | Barnett | .................... | H04M 1/21 |

(Continued)

FOREIGN PATENT DOCUMENTS

| CN | 216252882 | 4/2022 |
|---|---|---|
| JP | 2019527003 A | 9/2019 |

(Continued)

OTHER PUBLICATIONS

Decision to Grant Patent for KR 10-2022-0188842, dated Mar. 7, 2023, (pp. 1-8).

*Primary Examiner* — Ingrid M Weinhold
(74) *Attorney, Agent, or Firm* — Christensen O'Connor Johnson Kindness PLLC

(57) ABSTRACT

The present disclosure provides an accessory device for portable terminal, comprising: a body including a plurality of legs; an elastic tube positioned to surround the body; a first plate coupled to a central portion of the body; and a second plate coupled to end portions of the legs distal from the central portion. The body of the accessory device for portable terminal is configured to be positioned in a contraction position or a stand-up position by deforming the elastic tube in a transverse axis direction according to a force applied in a longitudinal axis direction of the body in a state in which the elastic tube is placed.

9 Claims, 8 Drawing Sheets

(56) References Cited

U.S. PATENT DOCUMENTS

| | | | | |
|---|---|---|---|---|
| 2021/0037127 | A1* | 2/2021 | Lee | F16M 13/00 |
| 2021/0301976 | A1* | 9/2021 | Cohen | F16M 13/06 |
| 2022/0120380 | A1* | 4/2022 | Epstein | H04M 1/04 |
| 2023/0134303 | A1* | 5/2023 | Lane | A45F 5/10 |
| | | | | 248/688 |

FOREIGN PATENT DOCUMENTS

| | | |
|---|---|---|
| KR | 10-2020-0075561 | 6/2020 |
| KR | 20-2020-0003677 | 10/2020 |
| KR | 10-2021-0125853 | 10/2021 |
| KR | 200490903 | 1/2022 |
| KR | 10-2022-0014279 | 2/2022 |
| KR | 20-2022-0002120 | 8/2022 |
| KR | 10-2022-0098545 | 12/2022 |

\* cited by examiner

ACCESSORY DEVICE FOR PORTABLE TERMINAL

This application claims the priority benefit of Korean Patent Application No. 10-2022-0149669, filed on Nov. 10, 2022, and Korean Patent Application No. 10-2022-0188842, filed on Dec. 29, 2022, in the Korean Intellectual Property Office, the disclosures of which are incorporated herein by reference in their entirety.

BACKGROUND

1. Field of the Invention

The following example embodiments, which relate to an accessory device for portable terminal, relate to the accessory device for portable terminal configured to be maintained in a contraction position or a stand-up position according to an applied force by including a body and an elastic tube surrounding the body.

2. Description of Related Art

According to communication technology and device-related technology, various smart devices including smart phones are widely distributed, and their availability is gradually increasing. Portable terminals such as the smart phones tend to be miniaturized, slimmed, and lightweighting in consideration of portability in appearance as well as functionality.

According to such trend of slimming and lightweighting of the portable terminals, there is also a demand for sliming and lightweighting of accessory devices (hereinafter, referred to as accessory) used in conjunction with the portable terminals. Furthermore, while the portable terminals are becoming slimmed and lightweighting, their screen size is gradually increasing, so according to the change of the screen size of the portable terminals, a need for mounting and using the accessory devices is also increasing.

As an accessory for portable terminal, there is a mounting accessory for maintaining the portable terminal at an appropriate angle when watching media contents through the portable terminal. Such mounting accessory needs to be designed in a size and a shape that stably maintains the portable terminal at an appropriate angle so that a user of the portable terminal may easily watch the media contents, and at the same time, does not interfere with carrying or charging (e.g. wireless charging) of the portable terminal by the user.

The information described above is merely for ease of understanding and may include contents that do not form part of the prior art.

SUMMARY

The example embodiments may provide an accessory for portable terminal which is configured to include a body including a plurality of legs and an elastic tube positioned to surround the body, and configured to be positioned in a contraction position or a stand-up position by deforming the elastic tube in a transverse axis direction according to a force applied in a longitudinal axis direction of the body in a state in which the elastic tube is placed.

It may provide the accessory for portable terminal that when a first force over a certain level in a longitudinal axis direction of the body is applied, even if the body is not contracted to the end by the force, the body is fixedly positioned in the contraction position by the elastic force of the elastic tube; when a second force over a certain level in a direction opposite to the first force is applied, even if the body is not stood up to the end by the force, the body is fixedly positioned in the stand-up position by the elastic force of the elastic tube.

According to one aspect, it provides an accessory device for portable terminal comprising a body including a plurality of legs; an elastic tube positioned to surround the body; a first plate coupled to a central portion of the body; and a second plate coupled to end portions of the legs distal from the central portion, wherein the body is maintained in the contraction position by a first force pressing the body in the longitudinal axis direction, and maintained in the stand-up position by a second force in a direction opposite to the first force in the longitudinal axis direction of the body.

The elastic tube may contract to a first contraction state after reaching a maximum expansion state in a transverse direction to maintain the body in the contraction position as the first force pressing the body in the longitudinal axis direction of the body is applied, the elastic tube may contract to a second contraction state after reaching a maximum expansion state in a transverse direction to maintain the body in the stand-up direction as the second force in the longitudinal axis direction is applied, and the elastic tube may expand more in the first contraction state than in the second contraction state.

Each leg of the legs includes a joint part, and for said each leg, a first length from the central portion to the joint part and a second length from the joint part to the end portion of said each leg may be different from each other, said each leg may be bent by the joint part by the first force to deform the elastic tube in the transverse axis direction to arrange the body in the contraction position, and said each leg may be stretched by the joint part by the second force to deform the elastic tube in the transverse axis direction to arrange the body in the stand-up position.

In the contraction position, a gap may exist between the first plate and the second plate, and the body may be changed from the contraction position to the stand-up position by the second force applied through the gap.

The second plate may include an accommodation space for accommodating at least part of the body and the elastic tube in the contraction position.

The accessory for portable terminal may further comprise a mounting surface to be attached to the portable terminal and a lower plate coupled to the second plate at a surface opposite to the mounting surface, and one of the second plate and the lower plate may include at least one protrusion, the other one of the second plate and the lower plate may include at least one hole or groove into which the protrusion is inserted, and the protrusion may be inserted into the hole or groove and the second plate or the lower plate may be rotated on the longitudinal axis so that the second plate and the lower plate are coupled each other.

The central portion may include a hole, the first plate may include a hole for coupling to the central portion, and the first plate and the body may be coupled by a ring member positioned through the hole of the central portion and the hole of the first plate.

The second plate may include a hole for coupling to the end portions of the legs, and each leg of the legs includes a foot part for maintaining to an outer circumference of the hole of the second plate in the end portions.

In the elastic tube, a circumference of at least part of a first portion surrounding said each leg corresponding to the first length may be smaller than a circumference of a second portion surrounding said each leg corresponding to the second length.

The circumference of the first portion may increase from a portion surrounding the central portion to a third portion surrounding the joint part, and the third portion may be thicker than the rest of the elastic tube.

It may provide an accessory for portable terminal including a structure that even if a body is not contracted to the end by a pressing force, the body is fixedly positioned in a contraction position by an elastic force of an elastic tube, and even if the body is not stood up to the end by a pulling force, the body is fixedly positioned in a stand-up position by the elastic force of the elastic tube. Therefore, a user of a portable terminal in which an accessory for portable terminal is mounted may change the accessory for portable terminal from a contraction position to a stand-up position with one hand.

It may implement an accessory for portable terminal that does not interfere with carrying or charging (e.g. wireless charging) of the portable terminal by the user by configuring a lower plate including a mounting surface for the portable terminal of the accessory for portable terminal to be detachable from the accessory for portable terminal.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1A:
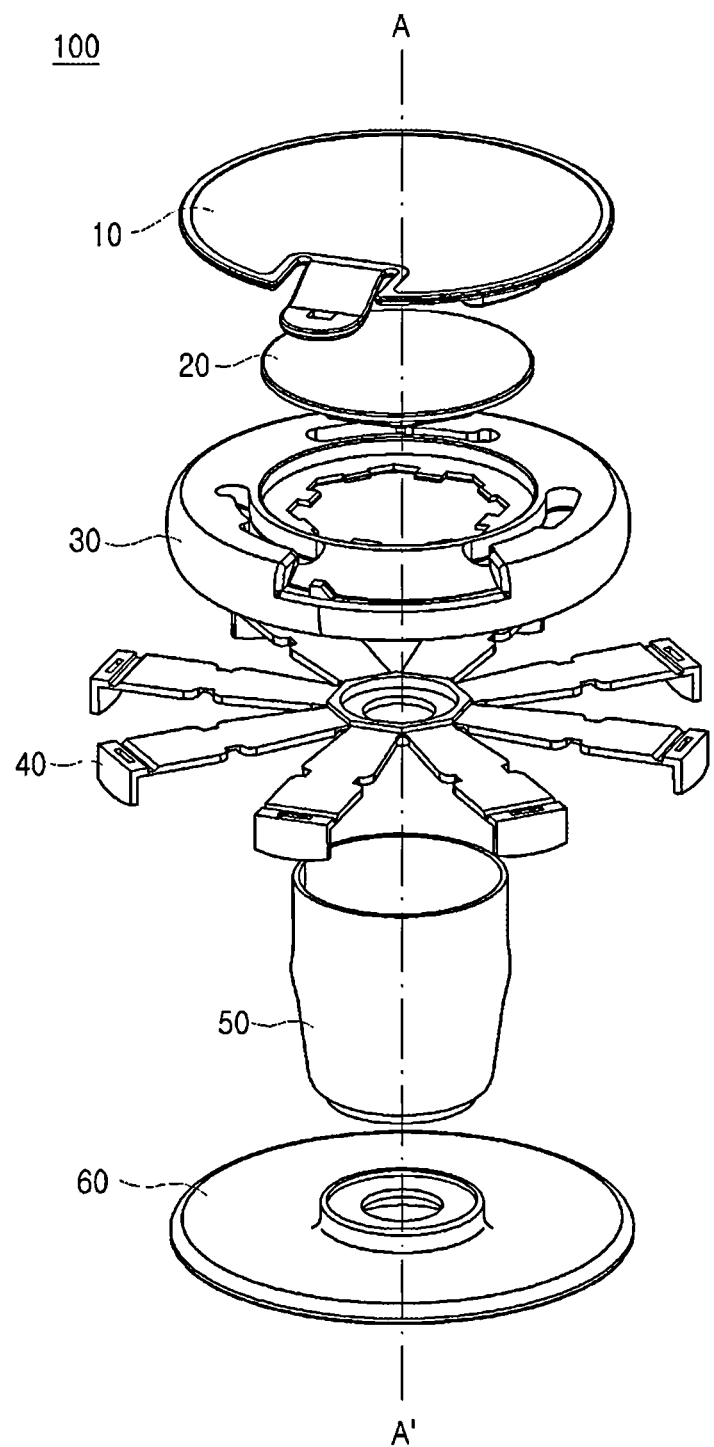
FIG. 1A is an exploded perspective view illustrating an accessory for portable terminal according to an example embodiment.

Hereinafter, embodiments of the disclosure are described in detail with reference to the accompanying drawings. However, the described embodiments may be modified in various other forms, and the scope of the disclosure is not restricted by the following embodiments. Furthermore, the embodiments of the disclosure are provided to fully describe the disclosure to a person having ordinary knowledge in the art to which the disclosure pertains. The shapes, sizes, etc. of elements in the drawings may be exaggerated for a clear description.

When it is said that one element is "connected" or "coupled" to the other element, it should be understood that one element may be directly connected or coupled to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Terms, such as a first, and a second, may be used to describe various elements, but the elements should not be restricted by the terms. The terms are used to only distinguish one element from the other element.

Also, terms, such as "part", and "module" described in this application, mean a unit that processes at least one function or operation, and this may be implemented with hardware or software, or a combination of hardware and software.

Also, elements of the embodiments described in detail with reference to the accompanying drawings are not restrictively applied to corresponding embodiments, and it may be implemented to be included in other embodiments within the scope of maintaining the technical idea of the present invention. In addition, although a separate description is omitted, it is natural that a plurality of embodiments may be re-implemented as one integrated embodiment.

Also, in the description with reference to the accompanying drawings, the same or related reference numerals are given to the same elements regardless of drawing numerals. In describing the present invention, when it is determined that a detailed description for related prior art may unnecessarily obscure the subject matter of the present invention, the detailed description will be omitted.

Figure 1B:
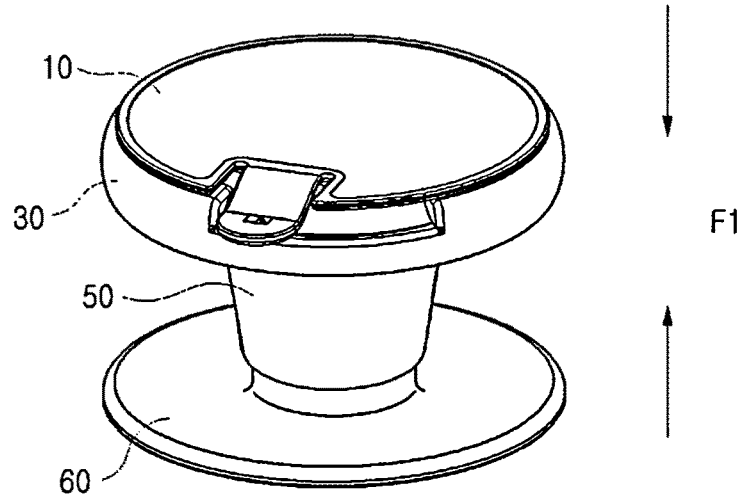
FIG. 1B is a perspective view illustrating an accessory for portable terminal positioned in a stand-up position according to an example embodiment.
Figure 1C:
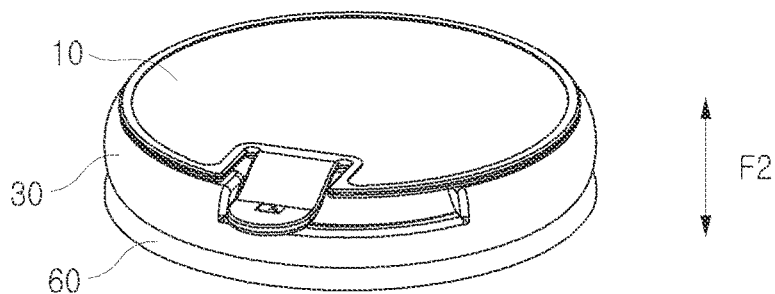
FIG. 1C is a perspective view illustrating an accessory for portable terminal positioned in a contraction position according to an example embodiment.
Figure 1D:
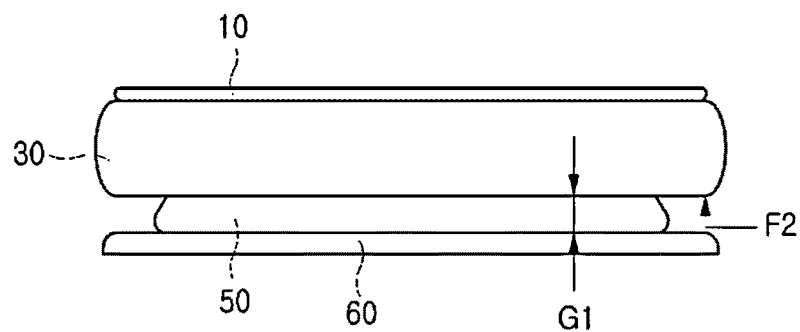
FIG. 1D is a side view illustrating an accessory for portable terminal positioned in a contraction position according to an example embodiment.

FIG. 1A is an exploded perspective view illustrating an accessory for portable terminal according to an example embodiment, FIG. 1B is a perspective view illustrating an accessory for portable terminal positioned in a stand-up position according to an example embodiment, FIG. 1C is a perspective view illustrating an accessory for portable terminal positioned in a contraction position according to an example embodiment, FIG. 1D is a side view illustrating an accessory for portable terminal positioned in a contraction position according to an example embodiment.

An accessory for portable terminal 100 of embodiments may be a device mounted on or attached to a portable terminal through one surface. For example, the accessory for portable terminal 100 may be attached to the portable terminal where an illustrated lower plate 10 is not illustrated. In FIG. 1A, for convenience of explanation, the lower plate 10 is shown at the upper part, and the side where a mounting surface attached to or mounted on the portable terminal is located may be defined as 'lower side'. However, according to embodiments, a mounting surface attached to or mounted on the portable terminal may be provided on the side of a first plate 60 corresponding to an upper plate.

The portable terminal may be an electronic device such as a smartphone, a navigation device, a PMP (Portable Media Player), a PDA (Personal Digital Assistants), a DMB (Digital Multimedia Broadcasting) player, a MP3 (MPEG Audio Layer-3) player, an electronic dictionary, a mobile phone, a tablet PC, and the like. Or, the portable terminal may include an electronic device which is portable by a user, not limited to the device.

The accessory for portable terminal 100 may be a device that is attached to or mounted on the portable terminal to increase availability of the portable terminal. For example, the accessory for portable terminal 100 may be a device attached to or mounted on the back of the portable terminal to maintain the portable terminal at a certain angle. The accessory for portable terminal 100 may provide a maintain function of the portable terminal at the certain angle to be positioned from a contraction position shown in FIG. 1C to a stand-up position shown in FIG. 1B. The certain angle may be an appropriate angle for watching media contents through a screen of the portable terminal of the user. Also, the accessory for portable terminal 100 may provide a grip that allows a user to hold the portable terminal in the stand-up position shown in FIG. 1B.

Like this, the accessory for portable terminal 100 may be a device for the purpose of providing a comfortable grip feeling to the user holding the portable terminal and improving the convenience of the user watching media contents through the portable terminal.

As shown, the accessory for portable terminal 100 may include a body 40 including a plurality of legs, an elastic tube 50 positioned to surround the body 40, a first plate 60 coupled to a central portion of the body 40, and a second plate 30 coupled to end portions of the legs distal from the central portion of the body 40.

For the second plate 30, a lower plate 10 including a mounting surface for the portable terminal which is not shown may be attached thereon. The upper surface of the shown lower plate 10 may be a mounting surface for the portable terminal. On the mounting surface, for example, an adhesive layer may be included or an adhesive may be applied, and through such mounting surface, the lower plate 10 may be mounted on or attached to the portable terminal. The lower plate 10 may be directly mounted on or attached to the portable terminal or mounted on or attached to a case mounted on the portable terminal. According to embodiments, it may be configured that the lower plate 10 does not exist and the second plate 30 has a mounting surface for the portable terminal.

On the second plate 30, a cover part 20 may be further mounted to maintain the coupling with the body 40.

As shown, the body 40 may include a plurality of legs, and such legs may be bent so that the distal end parts of the legs couple to the second plate 30. Meanwhile, the central portion of the body 40 may be coupled to the first plate 60 corresponding to the upper plate. On the first plate 60, when the accessory for portable terminal 100 is attached to or mounted on the portable terminal, an accessory part for improving a grip feeling for the portable terminal or maintaining an appropriate maintain angle of the portable terminal may be further attached. On a surface of the first plate 60 where such accessory part will be attached, an adhesive layer may be included or an adhesive may be applied. Meanwhile, according to embodiments, it may be configured that the first plate has a mounting surface for the portable terminal.

When assembling the accessory for portable terminal 100, the body 40 may be surrounded by the elastic tube 50. The elastic tube 50 may be named as an elastic body. The body 40 may be coupled to the first plate 60 and the second plate 30 while being surrounded by the elastic tube 50.

The accessory for portable terminal 100 may be positioned in a contraction position or a stand-up position according to a force applied in the shown longitudinal axis direction AA' of the body 40. In other words, the body 40 may be positioned in the contraction position or the stand-up position according to the force applied in the longitudinal axis direction AA'.

FIG. 1B and FIG. 1C illustrate the accessory for portable terminal 100 in assembled state, and illustrate the stand-up position and the contraction position, respectively.

As shown, the body 40 may be positioned in the contraction position or the stand-up position by deforming the elastic tube 50 in a transverse axis direction according to the force applied in the longitudinal axis direction AA' of the body 40 in a state in which the elastic tube 50 is positioned.

For example, as shown in FIG. 1B and FIG. 1C, the body 40 may be maintained in the contraction position by a first force F1 pressing the body in the longitudinal axis direction AA' of the body 40 (changed from the stand-up position to the contraction position). Or, the body 40 may be maintained in the stand-up position by a second force F2 in a direction opposite to the first force F1 in the longitudinal axis direction AA' of the body 40 (changed from the contraction position to the stand-up position).

The first force F1, for example, may be a force for contracting the body by pressing the upper surface or the lower surface of the accessory for portable terminal 100, and the second force F2 may be a force for standing up the body 40 by pulling the upper surface or the lower surface of the accessory for portable terminal 100.

In embodiments, by the structural features of the legs of the body 40 and the elastic force of the elastic tube 50, even if the body 40 is not contracted to the end by a pressing force such as the first force F1, the body 40 may be fixedly positioned in the contraction position by the elastic force of the elastic tube 50, and even if the body 40 is not stood up to the end by a pulling force such as the second force F2, the body 40 may be fixedly positioned in the stood-up position by the elastic force of the elastic tube 50. Accordingly, a user of the portable terminal on which the accessory for portable terminal 100 is mounted may easily change the accessory for portable terminal from the contraction position to the stand-up position with one hand (i.e., from the arrangement of FIG. 1C to the arrangement of FIG. 1B).

Regarding to this, FIG. 1D illustrates a side view according to one example of FIG. 1C.

FIG. 1D illustrates a side view of the accessory for portable terminal positioned to the contraction position according to an example embodiment.

As shown in FIG. 1D, in the contraction position of the body 40, a gap G1 between the first plate 60 and the second plate 30 may exist.

Such gap G1 may be an area for a user of the portable terminal to apply the second force F2 above described. For example, the user may apply the second force F2 with an operation of pushing or bouncing the first plate 60 by pushing a finger or nail to the gap G1. By the second force F2 applied through such gap G1, the body 40 may be changed from the shown contraction position to the stand-up position described above with reference to FIG. 1B. The transition from the contraction position to the stand-up position of the body 40 by such second force F2 may be performed by a user with one hand. Therefore, through embodiments, the accessory for portable terminal 100 capable of transitioning from the contraction position to the stand-up position by a user's one-touch operation may be provided.

According to embodiments, it is natural that the accessory for portable terminal 100 may be configured not to include such gap G1.

A more detailed structure of each element of the accessory for portable terminal 100 and a coupling method between the elements will be described in more detail with reference to FIGS. 2 to 9 to be described later.

Figure 2:
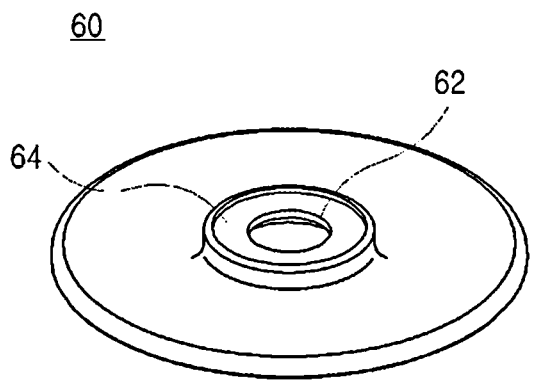
FIG. 2 illustrates a first plate corresponding to an upper plate of an accessory for portable terminal according to an example embodiment.

FIG. 2 illustrates a first plate corresponding to an upper plate of an accessory for portable terminal according to an example embodiment.

As shown, a first plate 60 may include a hole 62. The hole 62 may be located in a central area of the first plate 60. For example, as shown, the first plate 60 may be a circular shape. In addition, the hole 62 may also be a circular shape. However, according to embodiments, the shapes of the first plate 60 and the hole 62 may be different.

The hole 62 may be an element for coupling to the central portion of a body 40.

Figure 3:
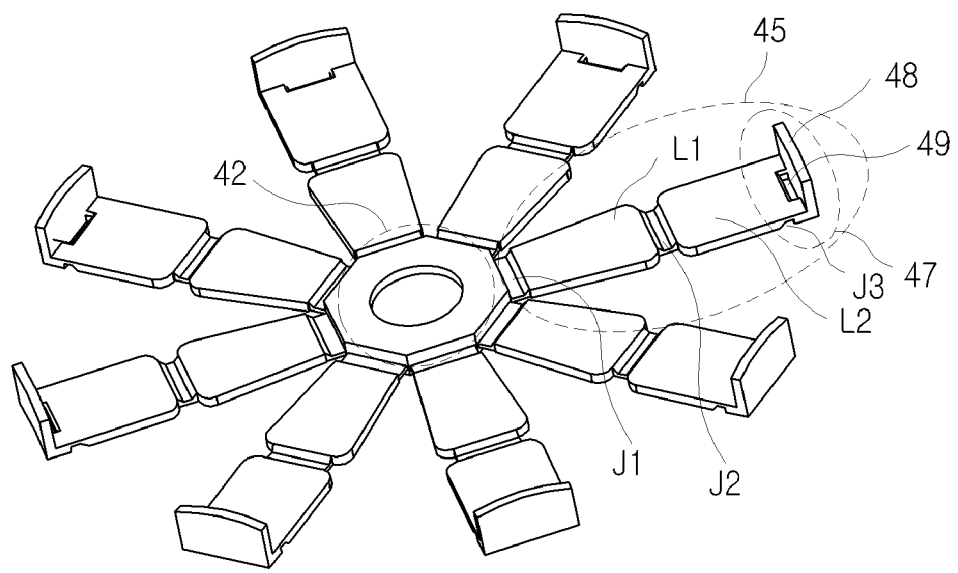
FIG. 3 illustrates a body of an accessory for portable terminal according to an example embodiment.

Regarding this, FIG. 3 illustrates a body of an accessory for portable terminal according to an example embodiment.

A body 40 may be made of a material such as plastic. For example, the body 40 may be made of PP (Polypropylene) material.

The body 40 may include a plurality of legs 45 as shown. For example, the legs 45 may be eight as shown. Or, the number of legs may be different according to implement of an accessory for portable terminal 100. The legs may be radially positioned based on a central portion 42.

The central portion 42 may include a hole. The hole of the central portion 42 may be an element for coupling with the first plate 60. The central portion 42 may protrude in a direction in which the first plate 60 is positioned when assembling. Meanwhile, a concave part 64 may be provided on the first plate 60 in respond to the protruding central portion 42. When assembling, the protruding central portion 42 may be located within the concave part 64.

The shape of the protruding central portion 42 may be circular or polygonal, and the number of sides of the polygon may be different depending on the number of the legs 45. For example, in the shown example, there are eight legs 45 exist, so the protruding central portion 42 may be an octagon. Therefore, the concave part 64 may be, for example, an octagon, as the polygonal shape corresponding to this.

Figure 9:
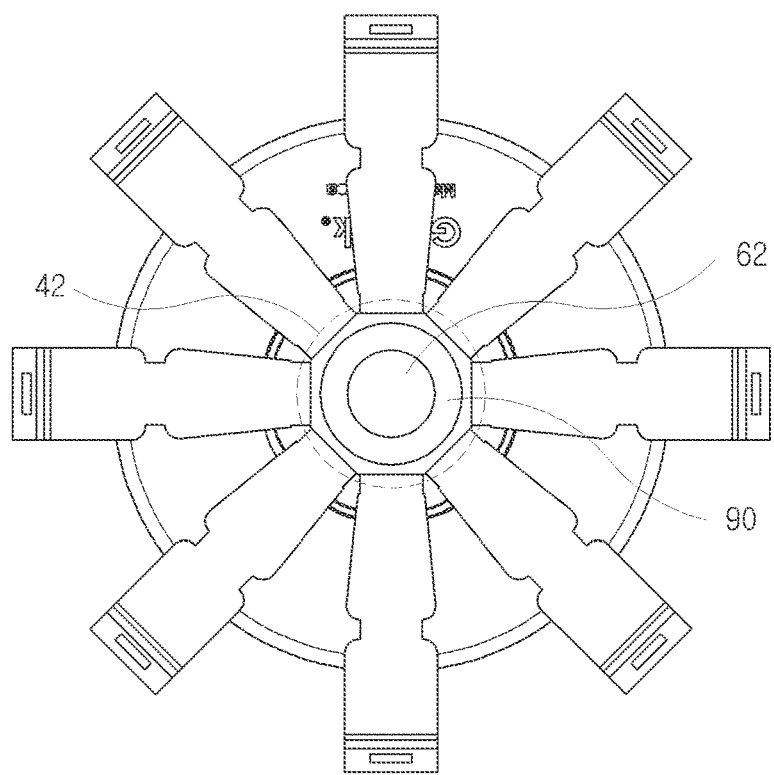
FIG. 9 illustrates a method for coupling a first plate to a body of an accessory for portable terminal according to an example embodiment.

Regarding this, FIG. 9 illustrates a method for coupling a first plate to a body of an accessory for portable terminal according to an example embodiment.

As shown in FIG. 9, by locating the protruding central portion 42 of the body 40 in the concave part 64 of the first plate 60, the body 40 may be coupled to the first plate 60. At this time, in the first plate 60 and the body 40, the hole of the central portion 42 and a hole 62 of the first plate 60 may be aligned.

As an example, the first plate 60 and the body 40 may be coupled each other by a ring member 90 positioned through the hole of the central portion 42 and the hole 62 of the first plate 60. The ring member 90 may be configured by at least one metal ring.

In addition to the coupling method by the ring member 90 (eyelet) as shown in FIG. 9, the body 40 and the first plate 60 may be coupled each other in various methods. As an example, the body 40 and the first plate 60 may have a male and female structure in the connection part, and they may be coupled each other by fitting such male and female structure each other.

For example, by arranging and coupling the ring member on both sides (i.e., each side of both surfaces of the first plate 60) of the aligned hole of the central portion 42 and the hole 62, respectively, the first plate 60 and the body 40 may be coupled each other.

Referring back to FIG. 3, each of the legs 45 will be described in more detail. In the below, for the convenience of the description, each leg may be described using the same reference number as the legs 45.

Each leg 45 of the legs 45 may include at least one joint part. For example, as shown, each leg 45 may include a second joint part J2 and a third joint part J3, including a first joint part J1 connected to the central portion 42. Also, each leg 45 may include a first leg part L1 between the first joint part J1 and the second joint part J2 and a second leg part L2 between the second joint part J2 and the third joint part J3. An end portion 47 may be configured, including the third joint part J3, or from the third joint part J3 to the end of each leg 45.

A leg portion in the joint part of each leg 45 may be bent. For example, each leg 45 may be bent inward (i.e., opposite to the protruding part of the central portion 42) by the first joint part J1, and each leg 45 may be also bent inward by the second joint part J2. Meanwhile, each leg 45 may be bent outward (i.e., to the protruding part of the central portion 42) by the third joint part J3. The joint part of each leg 45 may be bent in opposite direction in addition to the above described direction, but the bending in the above direction may be configured more suitable.

As shown in FIG. 3, a first length from the central portion 42 of each leg 45 to the joint part J2 may be different from a second length from the joint part J2 to the end portion 47 of each leg 45. For example, as shown, the first length may be longer than the second length, or unlike the shown, the second length may be longer than the first length. In the shown embodiment, the length of the first leg part L1 is longer than the length of the second leg part L2.

Like this, by a structure that the length of the first leg part L1 and the length of the second leg part L2 are different from each other (e.g., a structure that the length of the first leg part L1 is longer than the length of the second leg part L2) and a structure that the elastic tube 50 surrounds the body 40, by the elastic force of the elastic tube 50 in embodiments, even if the body 40 is not contracted to the end by the pressing force such as the first force F1, the body 40 may be fixedly positioned in the contraction position by the elastic force of the elastic tube 50, and even if the body 40 is not stood up to the end by the pulling force such as the second force F2, the body 40 may be fixedly positioned in the stood-up position by the elastic force of the elastic tube 50.

In other words, in the assembled state of the accessory for portable terminal 100 that the body 40 is surrounded by the elastic tube 50, each leg 45 may be bent by the joint part J2 by the first force F1 to deform the elastic tube 50 in the transverse axis direction, thereby arranging the body 40 in the contraction position. Meanwhile, each leg 45 may be stretched by the joint part J2 by the second force F2 to deform the elastic tube 50 in the transverse axis direction, thereby arranging the body 40 in the stood-up position. The transverse axis direction may indicate a direction parallel to the plane that is perpendicular to the longitudinal axis direction AA'. The transition to the contraction position and the stood-up position by the first force F1 and the second force F2 will be described in more detail with reference to FIG. 7 to be described later.

In the below, the elastic tube 50 positioned to surround the body 40 will be described in more detail.

Figure 4:
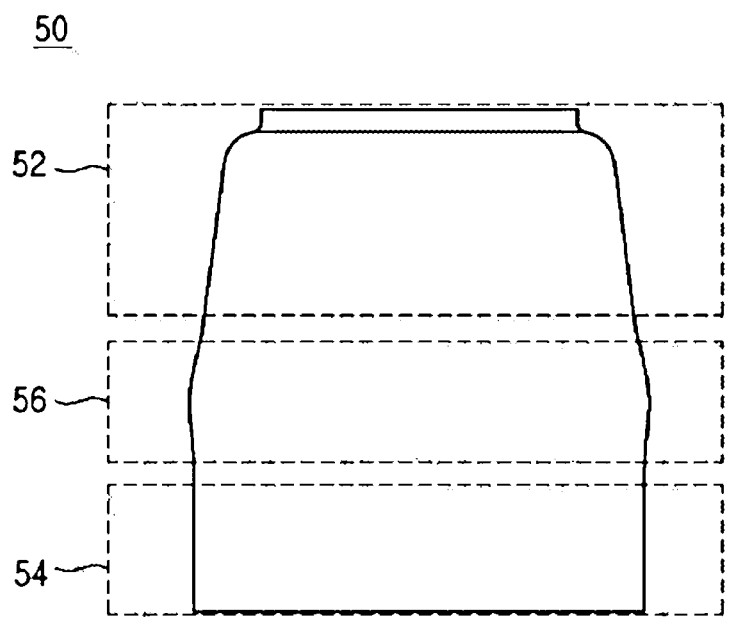
FIG. 4 illustrates an elastic tube of an accessory for portable terminal according to an example embodiment.

Regarding this, FIG. 4 illustrates an elastic tube of an accessory for portable terminal according to an example embodiment. In FIG. 4, a side view of the elastic tube 50 is illustrated.

The elastic tube 50 may be made of elastic materials. For example, the elastic tube 50 may be made of silicon materials or rubber materials. Or, the elastic tube 50 may be made of any other elastic materials.

The elastic tube 50 may be covered to the body 40 in a state that the legs 45 of the body 40 is bent by joint parts J1, J2, J3. In an area corresponding to the hole of the central portion 42 of the elastic tube 50, a hole may be provided. Also, in response to the protruding central portion 42, the upper part of the elastic tube 50 may be also protruded. The lower part side (i.e., the second plate 30 side) of the elastic tube 50 may be open.

The side surface of the elastic tube 50 may be a bell shape as shown. The elastic tube 50 may have a shape corresponding to the body 40 to be easily coupled to the body 40.

For example, for the elastic tube 50, circumference of at least part of the first part 52 surrounding each leg 45 corresponding to the first length (which is the length of the first leg part L1) is smaller than circumference of the second part 54 surrounding each leg 45 corresponding to the second length (which is the length of the second leg part L2).

As an example, the (outer) circumference of the first part 52 of the elastic tube 50 may increase from the part surrounding the central portion 42 side to the third part 56 surrounding to the joint part J2. In other words, the circumference of the first part 52 in contact with the third part 56 may be the largest of the circumference of the first part 52. Meanwhile, the third part 56 may be thicker than the rest part of the elastic tube 50. The third part 56, which is a part to be expanded in the transverse direction by receiving the force by the joint part J2, may be configured to be thicker than the rest part of the elastic tube 50. The (outer) circumference corresponding to the third part 56 may be also bigger than the circumference of the rest part of the elastic tube 50. The (outer) circumference corresponding to the second part 54 may be constant.

Next, the method of coupling the end portion 47 of the legs 45 of the body 40 to the second plate 30 will be described in more detail.

As shown in FIG. 3, each leg 45 may include the end portion 47. Such end portion 47 may be coupled to the second plate 30. More specifically, the end portion 47 may include a foot part 48, and may be coupled to the second plate 30 through such foot part 48.

Figure 5A:
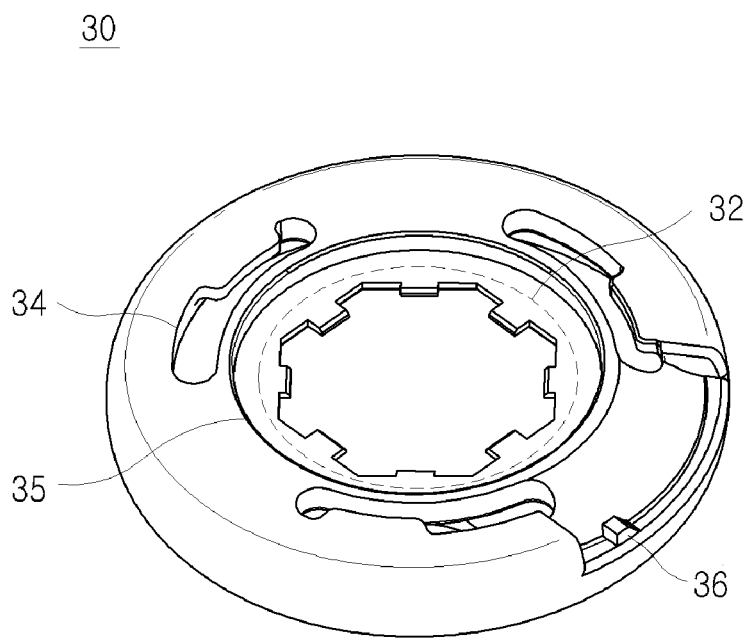
FIG. 5A and FIG. 5B illustrate a second plate corresponding to a cover plate of an accessory for portable terminal according to an example embodiment.
Figure 5B:
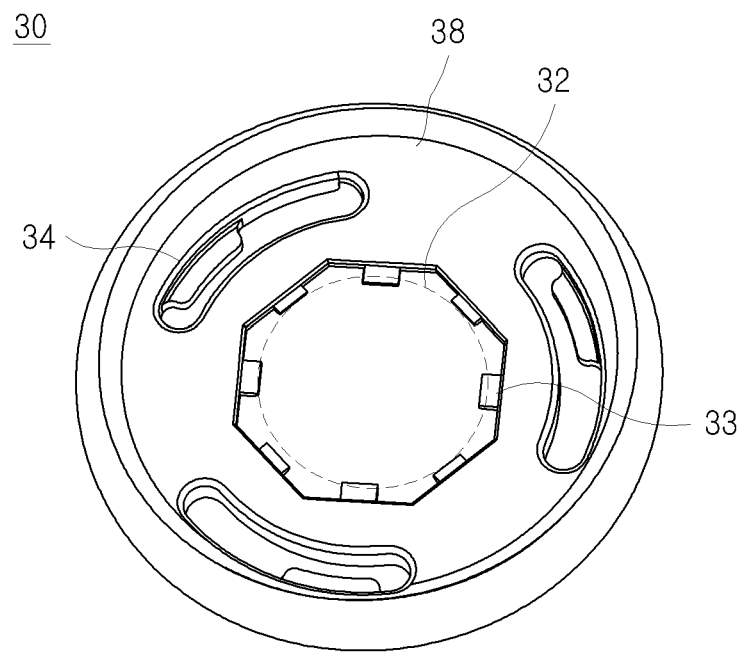

Regarding this, FIG. 5A and FIG. 5B illustrate a second plate corresponding to a cover plate of an accessory for portable terminal according to an example embodiment.

A second plate 30 may also be named as a cover plate of an accessory for portable terminal.

The second plate 30 may include a hole 32 for coupling to the end portion 47 of each leg 45. For each leg 45, the foot part 48 included in the end portion 47 may be maintained for an outer circumference of the hole 32 of the second plate 30.

Figure 8:
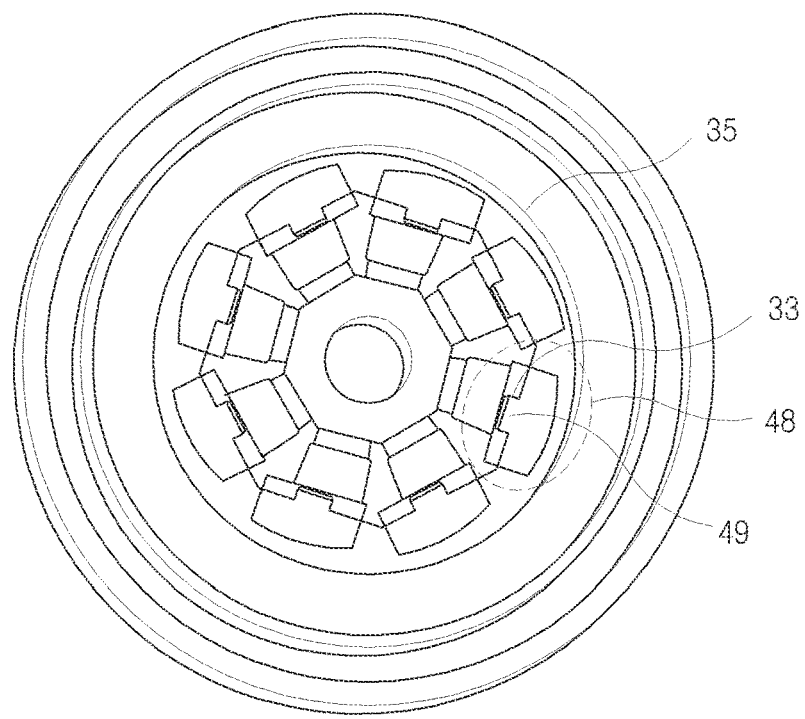
FIG. 8 illustrates a method for coupling a second plate to a body of an accessory for portable terminal according to an example embodiment.

Regarding this, FIG. 8 illustrates a method for coupling a second plate to a body of an accessory for portable terminal according to an example embodiment.

FIG. 8 shows the end portion 47 of the legs 45 (i.e., foot parts 48) coupled to the second plate 30 of FIG. 5A. As shown, each of the foot parts 48 may span surface of the second plate 30. Meanwhile, a concave portion 35 may be provided on the surface of the second plate 30 so that the foot parts 48 may be positioned.

As shown in FIGS. 3 and 8, each of the end portions 47 may further include a coupling hole or coupling groove 49. In response to each of the coupling hole or coupling groove 49, a coupling protrusion 33 may be provided on an outer circumference of the hole 32. By inserting the coupling protrusion 33 to each of the coupling hole or coupling groove 49, the foot parts 48 may be more firmly coupled to the second plate 30.

The shape of the hole 32 may be circular or polygonal, and the number of sides of the polygon may be different depending on the number of the legs 45 (i.e., the number of foot parts 48). For example, in the shown example, there are eight foot parts, so the shape of the hole 32 may be an octagon. Likewise, the eight coupling hole or coupling grove 49 and coupling protrusion 33 may be provided.

A cover part 20 may be further mounted on the concave portion 35. The foot parts 48 may be more firmly coupled to the second plate 30 by the cover part 20. A protrusion part having a shape corresponding to the hole 32 may be provided on a rear surface of the cover part 20 which is not shown in FIG. 1A and may be coupled to the hole, and accordingly, the foot parts 48 may be maintained steady to the second plate 30.

Meanwhile, in FIG. 5A and FIG. 5B showing a rear surface of the second plate 30 of FIG. 8, the second plate 30 may include an accommodation space 38 for accommodating at least part of the body 40 and the elastic tube 50 in the contraction position. To providing such accommodation space 38, the second plate 30 may have an appropriate thickness. According to the depth of the accommodation space 38, the size of the gap G1 described above with reference to FIG. 1D may be determined.

Meanwhile, unlike what is shown, the second plate 30 may include the accommodation space 38. At this time, an accommodation wall corresponding to the accommodation space 38 may not exist around a ring corresponding to the second plate 30, and side corresponding to at least part of the body 40 and the elastic tube 50 may be exposed as it is.

Also, (although omitted in FIG. 8), as in FIGS. 5A and 5B, the second plate 30 may further include an element for coupling with the above described lower plate 10.

Figure 6:
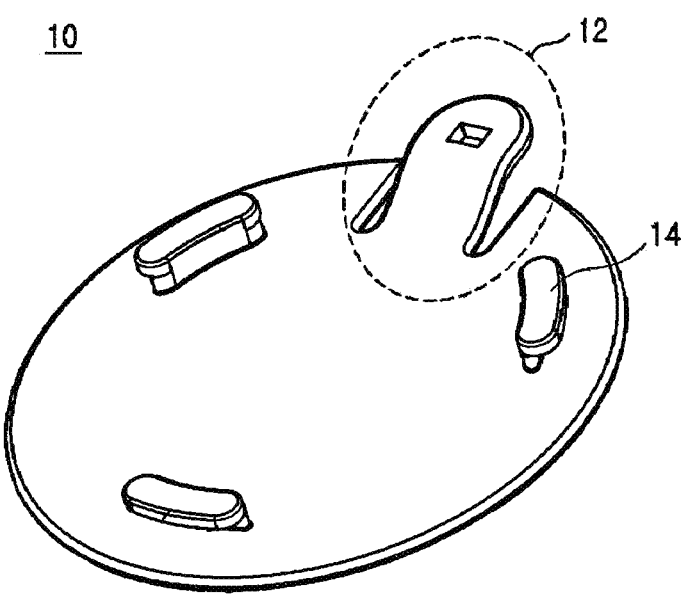
FIG. 6 illustrates a lower plate of an accessory for portable terminal including a mounting surface for the accessory for portable terminal according to an example embodiment.

In this regard, FIG. 6 illustrates a lower plate of an accessory for portable terminal including a mounting surface for portable terminal according to an example embodiment.

A lower plate 10 may include a mounting surface attached to the portable terminal, and may be configured to be coupled to the second plate on the opposite side of the mounting surface. Such lower plate 10 may be configured to be detachable the rest parts of the accessory for portable terminal 100 from the portable terminal. In other words, when the rest parts of the accessory for portable terminal 100 are detached, only the lower plate may be attached to the portable terminal. The lower plate 10 may have thin thickness. For example, the lower plate 10 may have a thickness that does not interfere with charging (wireless charging) of the portable terminal, and may be made of a material that does not interfere with charging (wireless charging) of the portable terminal.

For coupling, one of the second plate 30 and the lower plate 10 may include at least one protrusion. At this time, the rest one of the second plate and the lower plate 10 may include at least one hole or groove into which the protrusion is inserted. As the protrusion is inserted into the hole or groove and the second plate 30 or the lower plate 10 is rotated on the longitudinal axis AA', the second plate 30 and the lower plate 10 may be coupled each other.

In the example shown in FIGS. 5 and 6, the hole or groove 34 is provided on the second plate 30, and a protrusion 14 is provided on the lower plate 10.

However, as described above, it is possible that the protrusion is provided on the second plate 30 or a hole or groove is provided on the lower plate 10, and according to embodiments, a structure in which each of the second plate 30 and the lower plate 10 includes both the protrusion and the hole or groove may also be possible.

Describing with reference to examples shown in FIGS. 5 and 6, the protrusion 14 may be inserted into the hole or groove 34, and as the second plate 30 coupled to the lower plate 10 rotates in the state where the lower plate 10 is fixedly attached to the portable terminal, the second plate 30 and the lower plate 10 may be coupled each other. In other words, the second plate 30 and the lower plate 10 may be rotationally coupled each other.

The lower plate 10 may further include a handle 12. The handle 12 may include a hole, and the hole of the handle 12 may be coupled to a stopper 36 when the lower plate 10 and the second plate 30 are rotationally coupled each other. The stopper 36 which is provided on the second plate 30 may be an element to stop rotation of the handle 12. The lower plate 10 may be rotated within a certain range by the stopper 36. As the hole of the handle 12 is coupled to the stopper 36, reverse rotation of the second plate 30 may be prevented in a state in which the lower plate 10 and the second plate 30 are rotationally coupled each other. The handle 12 is configured to protrude in the protruding direction of the protrusion 14, so that the mounting surface for the portable terminal of the lower plate 10 may be kept flat. The protruding height of the handle 12 and the protruding height of the protrusion 14 may be the same.

On the second plate 30, corresponding to such handle 12, a lowered part may be provided. Due to the presence of such lowered part, the second plate 20 may be rotated by an area corresponding to the lowered part, and coupled to the lower plate 10.

Since the technical features described above with reference to FIGS. 1A to 1D may be similarly applied to FIGS. 2 to 6, 8, and 9, duplicated descriptions are omitted.

As described above with reference to FIGS. 2 to 6, 8, and 9, by coupling elements 10 to 60, the accessory for portable terminal 100 assembled in reference to FIGS. 1B and 1C may be manufactured.

Figure 7A:
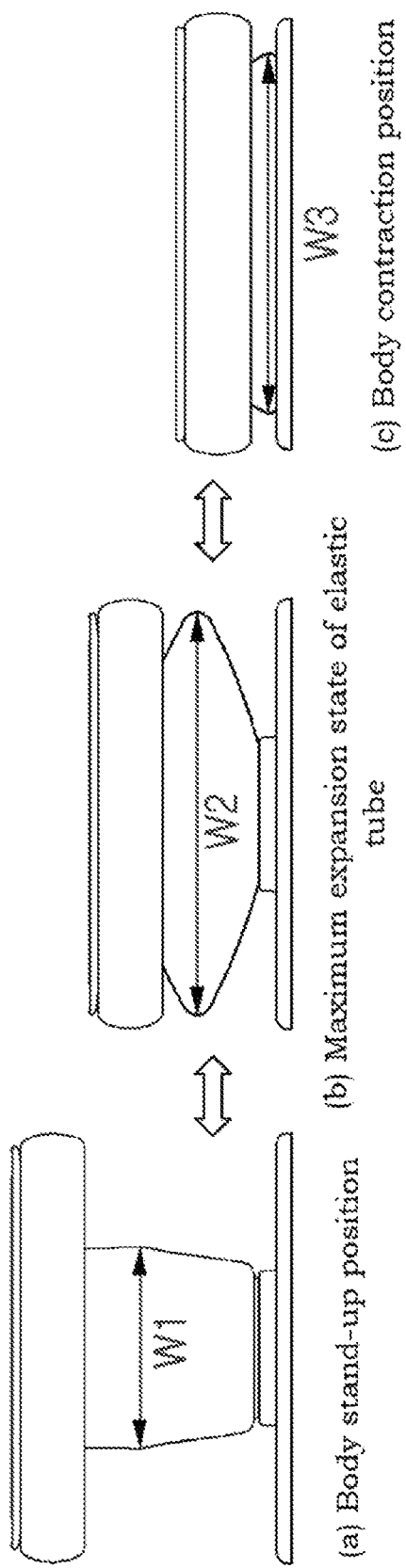
FIG. 7A illustrates a transition method between a stand-up position and a contraction position of an accessory for portable terminal according to an example embodiment.

FIG. 7A illustrates a transition method between a stand-up position and a contraction position of an accessory for portable terminal according to an example embodiment.

Figure 7B:
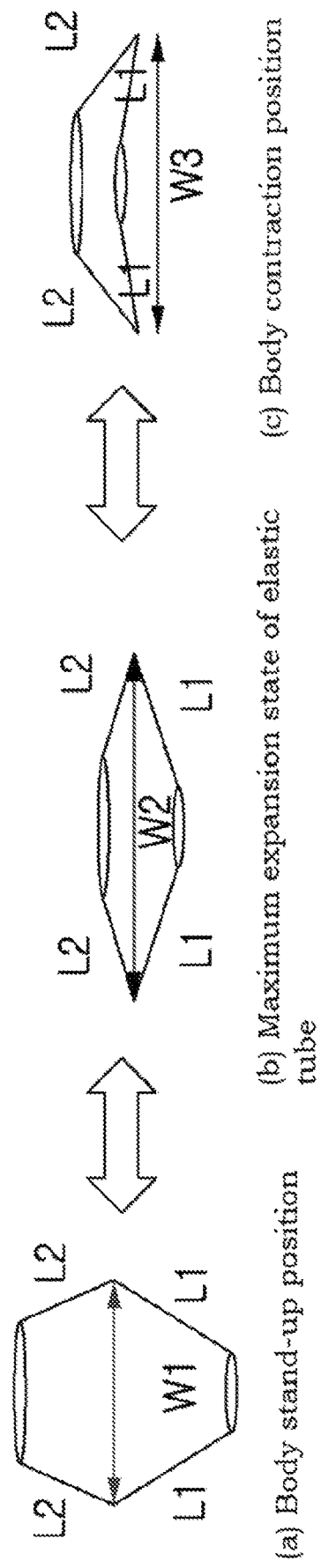
FIG. 7B roughly illustrates a cross section of a body in transition between a stand-up position and a contraction position of an accessory for portable terminal according to an example embodiment.

FIG. 7B roughly illustrates a cross section of a body in transition between a stand-up position and a contraction position of an accessory for portable terminal according to an example embodiment. In FIG. 7B, the elastic tube 50 is not shown to show an operation inside the body 40 when transitioning between the stand-up position and the contraction position.

As described above, the accessory for portable terminal 100 according to an example embodiment may be positioned and maintained in the stand-up position by causing the body 40 to stand-up by contracting the elastic tube 50 surrounding the body 40 by the pulling force F2 applied by a user with one touch.

For example, as the first force F1 pressing the body 40 in the longitudinal axis direction AA' of the body 40, the elastic tube 50 may contracts to a first contraction state after reaching a maximum expansion state in a transverse direction to maintain the body 40 in the contraction location. Meanwhile, as the second force F2 (pulling force as a force in a direction opposite to the first force F1) in the longitudinal axis direction AA' of the body 40 is applied, the elastic tube 50 may contracts to a second contraction state after reaching a maximum expansion state in a transverse direction to maintain the body in the stand-up position. Here, the elastic tube 50 may expand more in the first contraction state than in the second contraction state (i.e., W3>W1; W2>W3>W1).

Describing in more detail with reference to FIG. 7A, (a) of FIG. 7A shows that the body 40 is maintained in the stand-up position. At this time, the elastic tube 50 may be in the second contraction state. At this time, when the pressing first force F1 is applied, as the legs 45 are bent, the elastic tube 50 may gradually expand in the transverse direction to reach the maximum expansion state. (b) of FIG. 7A may shows that the elastic tube 50 is in the maximum expansion state. Here, when the application of the first force F1 is stopped, the elastic tube 50 returns to the second contraction state again, and the body 40 may return to the stand-up position. However, here, when the first force F1 is further applied, the elastic tube 50 is contracted to the first contraction state, and the body 40 may transition to the contraction position. At this time, a user does not need to press the first or second plate 60 or 30 to the end to transition the body 40 to the contraction position.

As described in FG. 7B, this may be achieved by making length of the first part L1 of each leg 45 longer than length of the second part L2. As shown, when the body 40 transitions from the stand-up position to the contraction position as the first force F1 is applied, the elastic tube 50 may be deformed from the second contraction state→the maximum expansion state→the first contraction state.

Meanwhile, (c) of FIG. 7A shows that the body 40 is maintained in the contraction position. At this time, the elastic tube 50 may be in the first contraction state. At this time, when the pulling second force F2 is applied, as the legs 45 are stretched, the elastic tube 50 may gradually expand in the transverse direction to reach the maximum expansion state. (b) of FIG. 7A shows that the elastic tube 50 is in the maximum expansion state. Here, when the application of the second force F2 is stopped, the elastic tube 50 returns to the first contraction state again, and the body 40 may return to the contraction position. However, here, when the second force F2 is further applied, the elastic tube 50 is contracted to the second contraction state, and the body 40 may transition to the stand-up position. At this time, a user does not need to pull the first or second plate 60 or 30 to the end to transition the body 40 to the stand-up position.

As described in FG. 7B, this may be achieved by making length of the first part L1 of each leg 45 longer than length of the second part L2. As shown, when the body 40 transitions from the contraction position to the stand-up position as the second force F2 is applied, the elastic tube 50 may be deformed from the first contraction state→the maximum expansion state→the second contraction state.

Therefore, in embodiments, to apply the second force F2, the body 40 may transition from the contraction position to the stand-up position with a one-touch way by the user performing an action of bouncing the first plate or second plate 60 or 30 (e.g., through the gap G1).

As shown, the expanded length W3 in the transverse direction of the elastic tube 50 in the first contraction state of the elastic tube 50, the expanded length W2 in the transverse direction of the elastic tube 50 in the maximum expansion state, and the expanded length W1 in the transverse direction of the elastic tube 50 in the second contraction state may be in a relation of W2>W3>W1.

Also, unlike those shown in FIGS. 7A and 7B, the length of the first part L1 of each leg 45 may be shorter than the length of the second part L2. Even in this case, the transition from the contraction position of the body 40 to the stand-up position with the one-touch way as described above may be similarly achieved. In other words, if the length of the first part L1 of each leg 45 is not the same as the length of the second part L2 and is configured differently, the transition from the contraction position of the body 40 to the stand-up position with the one-touch way of the embodiment may be similarly achieved.

Since the technical features described above with reference to FIGS. 1 to 6, 8, and 9 may be similarly applied to FIGS. 7A and 7B, duplicated descriptions are omitted.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. An accessory device for portable terminal, comprising:
a body including a plurality of legs;
an elastic tube positioned to surround the body;
a first plate coupled to a central portion of the body; and
a second plate coupled to end portions of the legs distal from the central portion,
wherein the body is movable to a contraction position in response to a first force over a threshold pressing the body in a longitudinal axis direction of the body, wherein the body is maintained in the contraction position without the first force being continuously applied after the body is positioned in the contraction position, and wherein the elastic tube is deformed in a transverse axis direction during movement of the body to the contraction position,
wherein the body is movable to a stand-up position in response to a second force over a threshold being applied in a direction opposite to the first force in the longitudinal axis direction, wherein the body is maintained in the stand-up position without the second force being continuously applied after the body is positioned in the stand-up position, and wherein the elastic tube is deformed in the transverse axis direction during movement of the body to the stand-up position, and
wherein each leg of the legs includes a joint part,
wherein, for each leg, a first length from the central portion to the joint part and a second length from the joint part to the end portion of each leg are different from each other,
wherein, when the first force is applied, each leg is bent and thereby deforms the elastic tube in the transverse axis direction to move the body to the contraction position, and
wherein, when the second force is applied, each leg is stretched and thereby deforms the elastic tube in the transverse axis direction to move the body to the stand-up position.

2. The accessory device for the portable terminal of claim 1, wherein, when the first force is applied, the elastic tube contracts, after reaching a maximum expansion state in the transverse axis direction, to a first contraction state, and thereby the body is positioned and maintained in the contraction position without the first force being continuously applied,
wherein, when the second force is applied, the elastic tube contracts, after reaching the maximum expansion state in the transverse axis direction, to a second contraction state, and thereby the body is positioned and maintained in the stand-up position without the second force being continuously applied, and
wherein the elastic tube expands more in the first contraction state than in the second contraction state.

3. The accessory device for the portable terminal of claim 1, wherein in the contraction position, a gap is provided between the first plate and the second plate.

4. The accessory device for the portable terminal of claim 1, wherein the second plate includes an accommodation space for accommodating at least part of the body and the elastic tube in the contraction position.

5. The accessory device for the portable terminal of claim 1, wherein the central portion includes a hole,
the first plate includes a hole for coupling to the central portion, and
the first plate and the body are coupled by a connecting member passing through the hole of the central portion and the hole of the first plate.

6. The accessory device for the portable terminal of claim 1, wherein the second plate includes a hole for coupling to the end portions of the legs, and
each leg of the legs includes a foot part in the end portion of said each leg respectively,
wherein each foot part is positioned on an outer circumference of the hole of the second plate to couple the end portions of the legs to the second plate.

7. The accessory device for the portable terminal of claim 1, wherein in the elastic tube, a circumference of at least part of a first portion surrounding said each leg corresponding to the first length is smaller than a circumference of a second portion surrounding said each leg corresponding to the second length.

8. The accessory device for the portable terminal of claim 7, wherein the circumference of the first portion increases from a portion surrounding the central portion to a third portion surrounding the joint part, and wherein the third portion is thicker than the rest of the elastic tube.

9. An accessory device for a portable terminal, comprising:
- a body including a plurality of legs;
- an elastic tube positioned to surround the body;
- a first plate coupled to a central portion of the body; and
- a second plate coupled to end portions of the legs distal from the central portion,
- wherein the body is movable to a contraction position in response to a first force over a threshold pressing the body in a longitudinal axis direction of the body, wherein the body is maintained in the contraction position without the first force being continuously applied after the body is positioned in the contraction position, and wherein the elastic tube is deformed in a transverse axis direction during movement of the body to the contraction position,
- wherein the body is movable to a stand-up position in response to a second force over a threshold being applied in a direction opposite to the first force in the longitudinal axis direction, wherein the body is maintained in the stand-up position without the second force being continuously applied after the body is positioned in the stand-up position, and wherein the elastic tube is deformed in the transverse axis direction during movement of the body to the stand-up position,
- wherein the accessory device further comprises a lower plate including a mounting surface configured to be attached to the portable terminal,
- wherein the lower plate is removably coupled to the second plate at a surface opposite to the mounting surface,
- wherein one of the second plate and the lower plate includes at least one protrusion,
- wherein the other one of the second plate and the lower plate includes at least one hole or groove into which the protrusion is inserted,
- wherein the lower plate includes a handle, the handle including a through hole, and the second plate includes a stopper, and
- wherein when the protrusion is inserted into the hole or groove and the second plate or the lower plate is rotated on the longitudinal axis, the stopper is inserted into the through hole of the handle, and the second plate and the lower plate are coupled to each other.

* * * * *